United States Patent
Balur et al.

(10) Patent No.: US 9,630,652 B2
(45) Date of Patent: Apr. 25, 2017

(54) VEHICLE PILLAR REINFORCEMENT CONSTRUCTION FOR SIDE IMPACT

(71) Applicants: Santosh Balur, Auburn Hills, MI (US); Andrew S Hulway, Grosse Pointe Woods, MI (US); Gary J. Bailey, Grand Blanc, MI (US); Radhakrishnan Raman, Troy, MI (US)

(72) Inventors: Santosh Balur, Auburn Hills, MI (US); Andrew S Hulway, Grosse Pointe Woods, MI (US); Gary J. Bailey, Grand Blanc, MI (US); Radhakrishnan Raman, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/638,616

(22) Filed: Mar. 4, 2015

(65) Prior Publication Data
US 2016/0257348 A1 Sep. 8, 2016

(51) Int. Cl.
| B62D 25/04 | (2006.01) |
| B62D 29/00 | (2006.01) |
| B62D 27/02 | (2006.01) |
| B62D 25/02 | (2006.01) |

(52) U.S. Cl.
CPC ............ *B62D 25/04* (2013.01); *B62D 25/02* (2013.01); *B62D 25/025* (2013.01); *B62D 27/02* (2013.01); *B62D 29/00* (2013.01)

(58) Field of Classification Search
CPC ...... B62D 25/04; B62D 25/025; B62D 29/00; B62D 27/02; B62D 25/02
See application file for complete search history.

(56) References Cited

U.S. PATENT DOCUMENTS

| 6,059,899 | A | 5/2000 | Shibata et al. |
| 6,793,274 | B2 | 9/2004 | Riley et al. |
| 7,594,691 | B2 | 9/2009 | Koormann et al. |
| 7,735,906 | B2 | 6/2010 | Takahashi et al. |
| 8,007,032 | B1 | 8/2011 | Craig |
| 8,292,354 | B2 | 10/2012 | Bodin et al. |

(Continued)

FOREIGN PATENT DOCUMENTS

| DE | 10305725 B3 | 4/2004 |
| DE | 102009041703 A1 * | 4/2010 ............. B62D 25/04 |

(Continued)

OTHER PUBLICATIONS

International Search Report and Written Opinion dated Apr. 18, 2016 for International Application No. PCT/US2016/015102, International Filing Date Jan. 27, 2016.

*Primary Examiner* — Glenn Dayoan
*Assistant Examiner* — Melissa A Black
(74) *Attorney, Agent, or Firm* — Ralph E. Smith

(57) ABSTRACT

A side structure for a vehicle is provided and includes a sill and a header spaced apart from the sill. A pillar outer body extends between the sill and the header and defines an inner channel open toward an interior of the vehicle. An inner cover is attached to the pillar outer body and extends between the sill and the header. The inner cover has a lower cover portion disposed proximate to the sill and formed of a first material having a first ductility and an upper cover portion disposed proximate to the header and formed of a second material having a second ductility less than the first ductility.

20 Claims, 5 Drawing Sheets

(56) References Cited

U.S. PATENT DOCUMENTS

| | | |
|---|---|---|
| 2009/0250967 A1 | 10/2009 | Bodin |
| 2011/0133515 A1* | 6/2011 | Mori .................... B62D 21/157 |
| | | 296/193.06 |
| 2011/0233970 A1 | 9/2011 | Nagai et al. |
| 2014/0191536 A1* | 7/2014 | Elfwing ................ B62D 25/04 |
| | | 296/193.06 |

FOREIGN PATENT DOCUMENTS

| | | |
|---|---|---|
| EP | 2535242 A1 | 12/2012 |
| WO | 01/71434 A1 | 6/2011 |

* cited by examiner

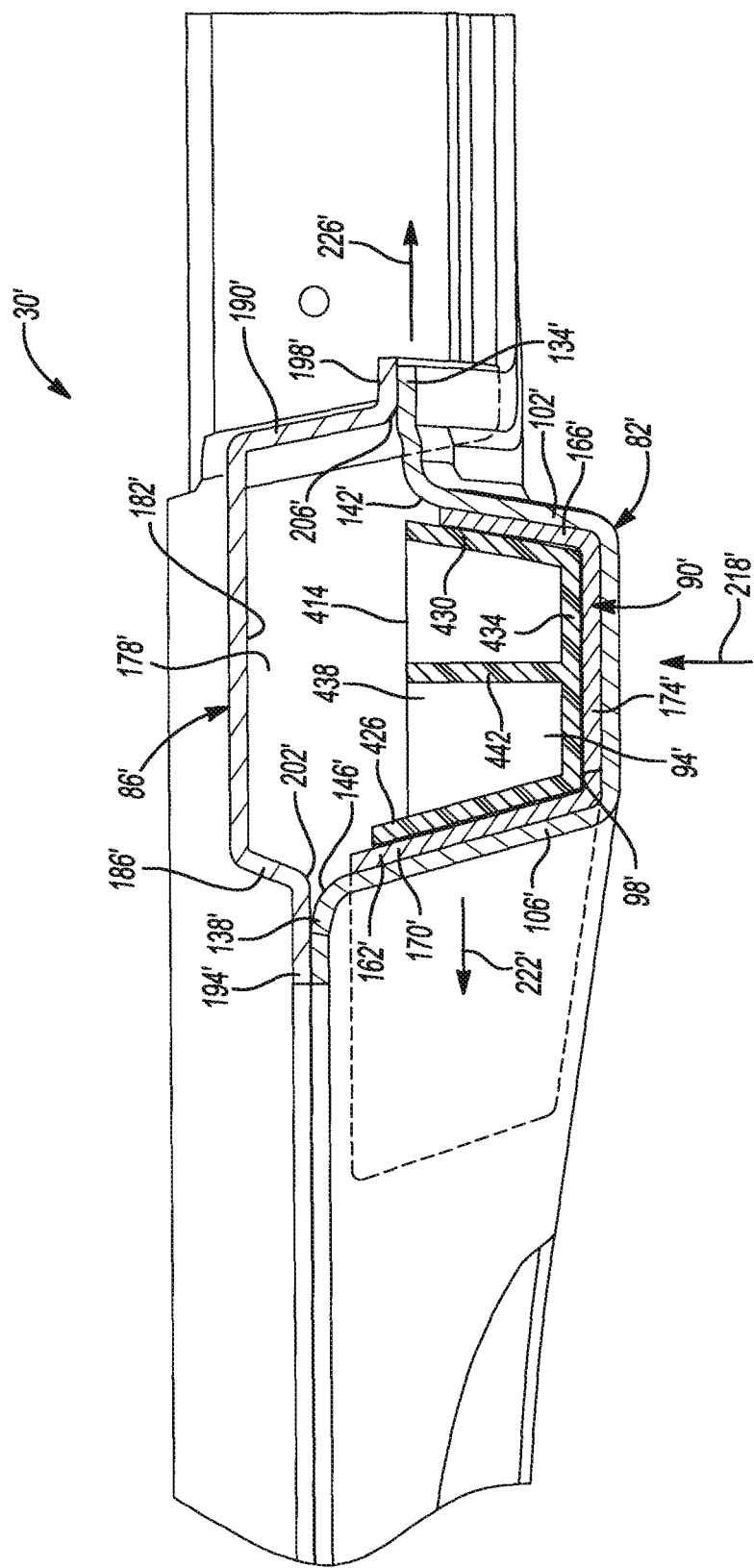

VEHICLE PILLAR REINFORCEMENT CONSTRUCTION FOR SIDE IMPACT

FIELD

The present disclosure relates to vehicle structure and more particularly to vehicle side structure having a reinforced pillar.

BACKGROUND

This section provides background information related to the present disclosure which is not necessarily prior art.

Vehicles conventionally have an internal body structure including a sill extending along the base of the vehicle, a header extending along the top of the vehicle, and a plurality of pillars extending between the sill and the header. Impacts from objects or other vehicles that occur at, or near a pillar can impose dynamic forces on the pillar. Such forces may be directly applied to the pillar and/or may be transmitted to the pillar from the sill and/or header, thereby causing deformation of the pillar. The degree and location of such deformation is regulated by various regulatory entities to e,nsure sufficient forces are absorbed during an impact event. Such deformation is typically determined during vehicle testing, such as side-impact testing outlined by the Insurance Institute for Highway Safety, for example.

Current vehicle pillars such as b-pillars, for example, are constructed with increased hardness of the pillar material and/or inserts that merely increase the stiffness of the pillar. However, increasing the hardness or stiffness of the pillar can lead to ripping or buckling of the pillar material, thereby preventing the pillar from adequately absorbing forces associated with an impact event. Other pillars are constructed using complex heating and cooling methods in an effort to mitigate such ripping and buckling. While such methods improve the performance of the pillar in absorbing applied forces while concurrently reducing the likelihood of ripping or buckling of the pillar material, such methods can be complicated and costly.

SUMMARY

A side structure for a vehicle is provided and includes a sill and a header spaced apart from the sill. A pillar outer body extends between the sill and the header and defines an inner channel open toward an interior of the vehicle. An inner cover is attached to the pillar outer body and extends between the sill and the header. The inner cover has a lower cover portion disposed proximate to the sill and formed of a first material having a first ductility and an upper cover portion disposed proximate to the header and formed of a second material having a second ductility less than the first ductility.

In another configuration, a side structure for a vehicle is provided and includes a sill and a header spaced apart from the sill. A pillar extends between the header and the sill and defines an inner channel having a lower portion disposed proximate to the sill and an upper portion disposed proximate to the header, whereby the lower portion is formed from a first material having a first ductility. The side structure additionally includes a reinforcement member formed from a second material having a second ductility less than the first ductility. The reinforcement member is received within the inner channel and is attached to the pillar proximate to a junction of the pillar and the sill.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 5 is a cross-sectional view of the pillar of FIG. 4 taken along line 5-5 of FIG. 1.

Corresponding reference numerals indicate corresponding parts throughout the several views of the drawings.

DETAILED DESCRIPTION

Example embodiments will now be described more fully with reference to the accompanying drawings.

The description of the invention is merely exemplary in nature and, thus, variations that do not depart from the gist of the invention are intended to be within the scope of the invention. Such variations are not to be regarded as a departure from the spirit and scope of the invention.

Figure 1:
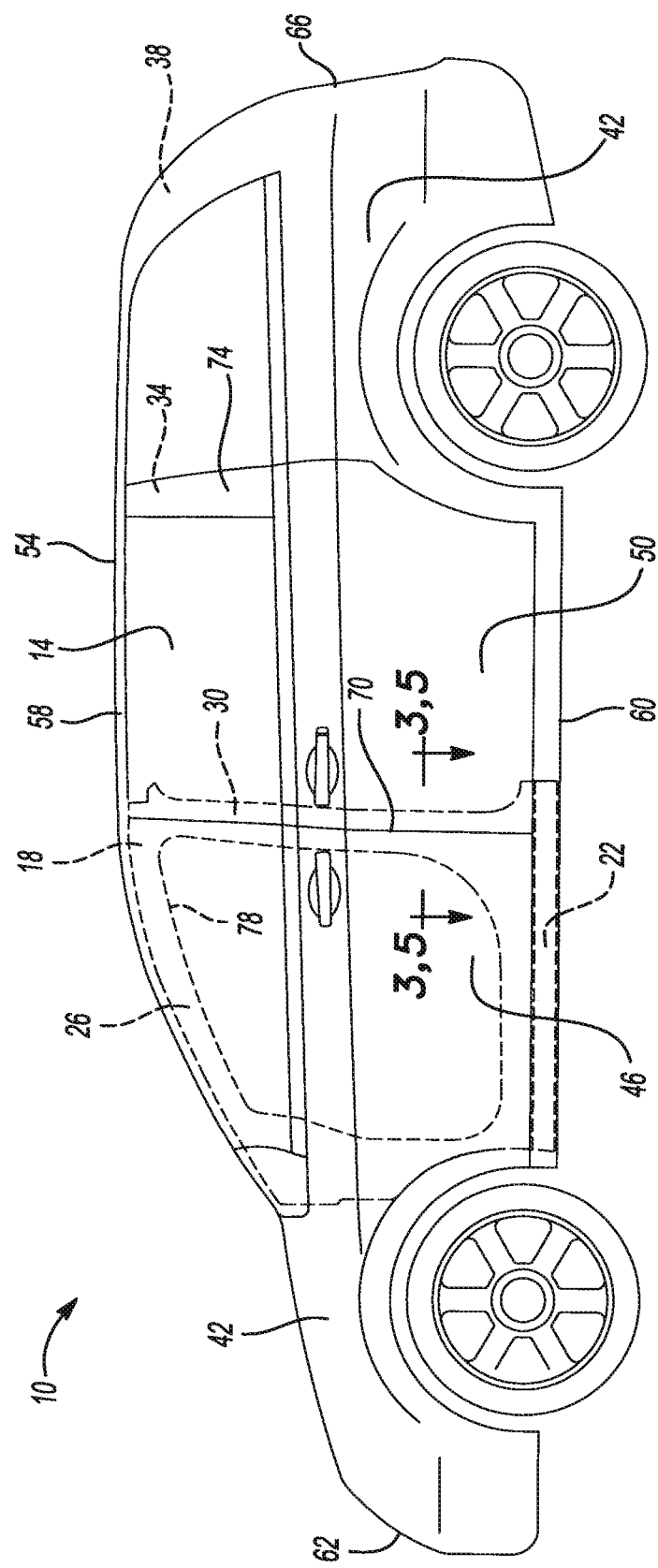
FIG. 1 is a perspective view of a vehicle body having a vehicle body side in accordance with the present disclosure.

With reference to FIG. 1, a vehicle 10 having a vehicle body side 14 is shown. The vehicle body side 14 includes a header 18, a sill 22, an A-pillar or first pillar 26, a B-pillar or second pillar 30, a C-pillar or third pillar 34, and a D-pillar or fourth pillar 38. The vehicle body side 14 supports one or more body panels 42 and one or more doors, such as a front door 46 and a rear door 50. While the example provided in FIG. 1 illustrates the vehicle body side 14 as a left side of the vehicle 10, the vehicle body side 14 can alternatively be a right side. Further, while shown with respect to a van or sport utility vehicle (SUV), the vehicle body side 14 can be used in any type of vehicle such as a car, truck, bus, or military vehicle.

The header 18 extends longitudinally along a top side 54 of the vehicle 10 and supports a vehicle roof 58. The sill 22 extends longitudinally along a bottom side 60 of the vehicle 10, proximate to the ground (not shown) during normal operation of the vehicle 10. The first pillar 26 is coupled to the header 18 and the sill 22 and extends therebetween proximate to a front end 62 of the vehicle 10. The third pillar 34 is coupled to the header 18 and the sill 22 and extends therebetween proximate to a rear end 66 of the vehicle 10. The second pillar 30 is coupled to the header 18 and the sill 22 and extends therebetween in an area 70 of the vehicle body side 14 between the first pillar 26 and the rear end 66 of the vehicle 10. While not specifically shown, the third pillar 34 is coupled to the header 18 and the sill 22 and extends therebetween in an area 74 of the vehicle body side 14 between the second pillar 30 and the rear end 66 of the vehicle 10. While not specifically shown, the fourth pillar 38 is coupled to the header 18 and the sill 22 and extends therebetween proximate to the rear end 66 of the vehicle 10.

The first pillar 26, the second pillar 30, the header 18, and the sill 22 define a body-side opening 78. The second pillar 30, the third pillar 34, the header 18, and the sill 22 likewise define a body-side opening (not shown). In the example provided, the body-side opening 78 allows ingress and egress to the vehicle 10 through the front door 46 and the body-side opening defined by the second pillar 30 and the third pillar 34 allows ingress and egress to the vehicle 10 through the rear door 50. While the present example is illustrated with first, second, third, and fourth pillars 26, 30, 34, 38 the vehicle body side 14 could be constructed with additional or fewer pillars. While the present disclosure will be described with reference to the second pillar 30, the other pillars 26, 34, 38 could be constructed in a similar fashion.

Figure 2:
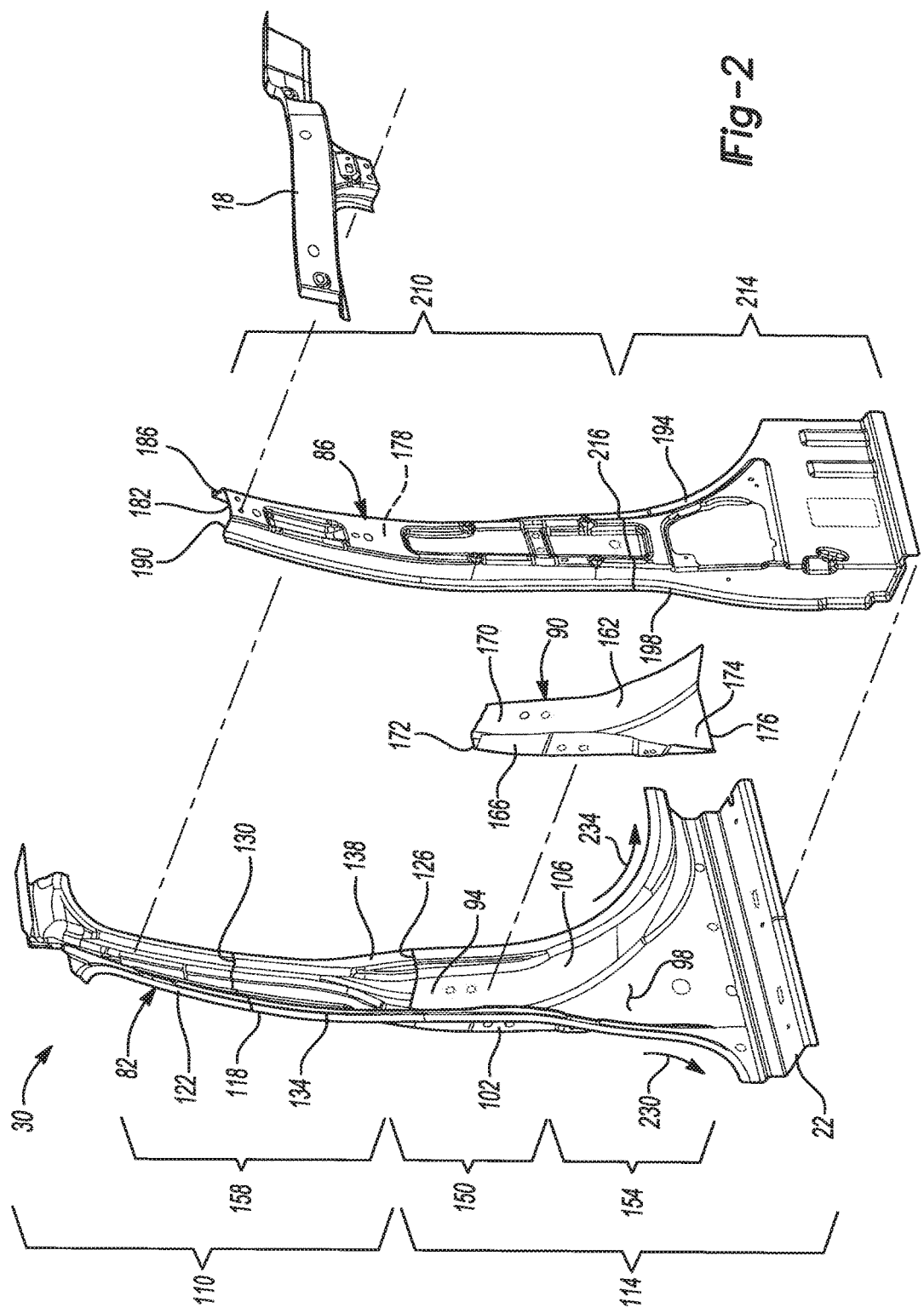
FIG. 2 is an exploded view of a portion of the vehicle body side of FIG. 1 showing a pillar of a first construction.
Figure 3:
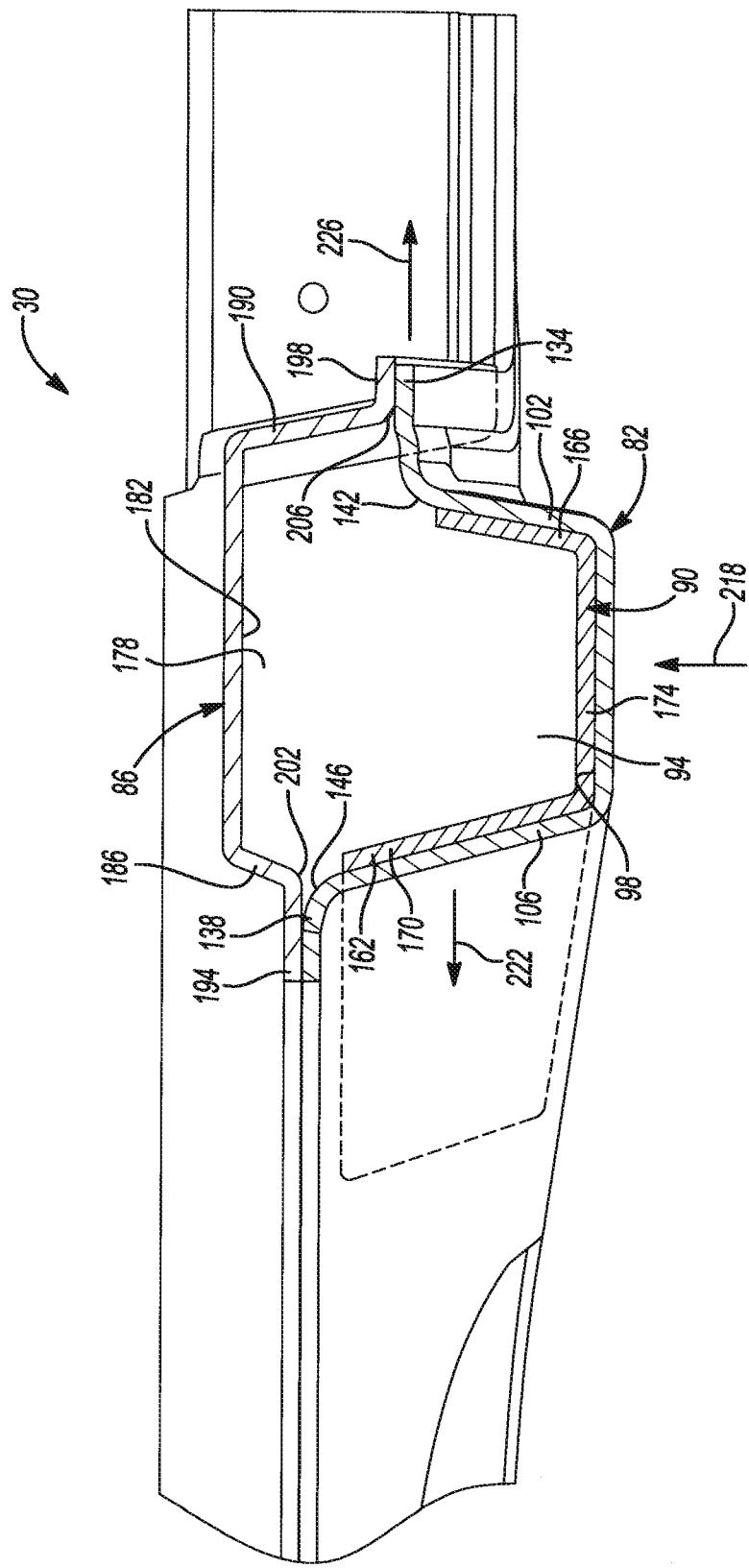
FIG. 3 is a cross-sectional view of the pillar of FIG. 2 taken along line 3-3 of FIG. 1.

With additional reference to FIGS. 2 and 3, the second pillar 30 includes a pillar outer body 82, a pillar inner body 86, and a reinforcement member 90. The pillar outer body 82 extends the entire length of the second pillar 30 from the header 18 to the sill 22 and is coupled to the header 18 and the sill 22. The pillar outer body 82 defines a channel 94 with a trough surface 98 disposed between a pair of sidewalls 102, 106. The pillar outer body 82 has an upper portion 110 that narrows as the upper portion 110 approaches the header 18 and a base portion 114 that widens as the base portion 114 approaches the sill 22. The base portion 114 is located along the second pillar 30 such that a bumper of another vehicle or a bumper of a side-impact test mule (neither shown) will impact the second pillar 30 at the base portion 114. While vehicles have bumpers of varying heights, the base portion 114 is positioned along a length of the second pillar 30 in a location to receive a side-impact test mule in accordance with side-impact testing outlined by the Insurance Institute for Highway Safety, for example, in an effort to maximize the likelihood that a bumper of another vehicle contacts the second pillar 30 within the base portion 114 during an impact event.

The base portion 114 is formed of a relatively ductile material having a first ductility. In the example provided, the base portion 114 is formed from a press-hardened steel of grade PQS370Y550T having a tensile strength of approximately 550-700 MPA, a yield strength of approximately of 370-500 MPA, a percent total elongation in 25 mm of greater than or equal to 16%, a core hardness of 170-220 HV, and a core hardness of 85-95 HRB. The PQS370Y550T steel can optionally have an aluminum coating configured to inhibit corrosion of the steel material. One example of such a material commercially available is known as Ductibor® 500P steel. In the example provided, the base portion 114 is formed in approximately 1.6 mm gauge, though other thicknesses can be used. The upper portion 110 has a second ductility, which is less than the first ductility. In the example provided, the upper portion 110 is formed of a relatively harder press-hardened steel material of grade PHS950Y1300T having a tensile strength of approximately 1300-1650 MPA, a yield strength of approximately 950-1250 MPA, a percent of total elongation in 25 mm of greater than or equal to 6%, a core hardness of 400-500 HV, and a core hardness of 41-49 HRC. The PHS950Y1300T steel can optionally have an aluminum coating configured to inhibit corrosion of the steel material. One example of such a material commercially available is known as Usibor® 1500P steel.

In the example provided, a first length 118 of the upper portion 110, proximate to the base portion 114, is formed from approximately 2.0 mm gauge steel and a second length 122 of the upper portion 110, proximate to the header 18, is formed from approximately 1.6 mm gauge steel such that the upper portion 110 has two gauge thicknesses, though other thicknesses can be used. In the example shown, the upper portion 110 and the base portion 114 are delineated by a line 126 and the first and second lengths 118, 122 of the upper portion 110 are delineated by a line 130. The first length 118 of the upper portion 110, the second length 122 of the upper portion 110, and the base portion 114 are welded together to form one continuous blank sheet of steel before being formed into the shape described herein.

The channel 94 extends substantially the length of the second pillar 30 between the header 18 and the sill 22. The trough surface 98 of the channel 94 faces the interior of the vehicle 10, such that the channel 94 opens toward the interior of the vehicle 10. The pillar outer body 82 further includes a pair of flanges 134, 138 extending from crests 142, 146 of the sidewalls 102, 106. Flange 138 extends generally longitudinally toward the front end 62 of the vehicle 10 and flange 134 extends generally longitudinally toward the rear end 66 of the vehicle 10. As best seen in FIG. 3, the pillar outer body 82 has a generally trough-shaped cross-section formed by the channel 94 and the flanges 134, 138. In the example provided, the sidewall 106 extends further inward toward the interior of the vehicle 10 than the sidewall 102 such that flange 138 is inboard of the flange 134, though their relative locations can vary along the length of the channel 94.

The width of the channel 94 varies along the length of the channel 94. In particular, the channel 94 has a middle section 150, a lower section 154, and an upper section 158. The middle section 150 has a first width and extends between the upper portion 110 and the base portion 114. The lower section 154 extends from the middle section 150, within the base portion 114, toward the sill 22. The width of the lower section 154 expands from the first width at the middle section 150 to a greater, second width proximate to the sill 22. The width of the lower section 154 expands gradually such that the base portion 114 of the pillar outer body 82 has a generally flared shape. The upper section 158 has a width that expands from the middle section 150 to a third width, then gradually contracts to a fourth width proximate to the header 18. The third width is greater than the first width and is less than the second width. The fourth width is greater than the first width and is less than the third width. The depth of the channel 94 also varies along the length of the channel 94 and is generally deeper at the middle section 150 and lower section 154 and is more shallow at the upper section 158.

With specific reference to FIGS. 2 and 3, the reinforcement member 90 includes a reinforcement body 162 having a pair of sides 166, 170 and a span 174 connecting the sides 166, 170 to form a generally U-shaped cross-section shaped to the contour of the channel 94. Namely, each side 166, 170 aligns with one of the sidewalls 102, 106 and the span 174 aligns with the trough surface 98 on the interior of the channel 94. The reinforcement body 162 has a flared shape that is similar to the flared shape of the base portion 114 of the channel 94. In this way, the U-shaped cross-section formed by the sides 166, 170 and the span 174 is narrower proximate to a top 172 of the reinforcement body 162 and is wider proximate to a bottom 176 of the reinforcement body 162. The top 172 is disposed proximate to the header 18 and the bottom 176 is disposed proximate to the sill 22.

The reinforcement body 162 is disposed within the channel 94 such that the top 172 extends into the upper portion 110 of the pillar outer body 82 and the bottom 176 extends into the base portion 114 of the pillar outer body 82. In the example provided, the top 172 does not extend the entire length of the upper portion 110 to the header 18 and only extends into the first length 118 of the upper portion 110. Further, the bottom 176 does not extend the entire length of the base portion 114 to the sill 22. Accordingly, the reinforcement body 162 is disposed partially in the upper portion 110 and partially in the base portion 114 to allow the reinforcement body 162 to be located in an area likely to receive a bumper of another vehicle during an impact event. Each side 166, 170 is welded to the respective sidewall 102, 106 to fix a position of the reinforcement body 162 relative to the pillar outer body 82. In one method of assembly, the reinforcement body 162 is welded as a flat, blank piece to the blank sheet of the upper portion 110 and the base portion 114 before the combined blanks are shaped together. When the reinforcement body 162 is welded as a blank piece and shaped with the upper and base portions 110, 114, the span 174 can also be welded to the trough surface 98 before shaping the blanks. In another method of assembly, the reinforcement body 162 is pre-formed into the corresponding shape, then inserted into the channel 94 and welded in place. When the reinforcement body 162 is pre-formed, the span 174 can be not welded to the trough surface 98 or can be welded thereto.

The reinforcement body 162 is formed of a material having a third ductility that is equal to the first ductility of the base portion 114. The reinforcement body 162 is formed of a steel of grade PQS370Y550T in approximately 1.2 mm gauge. In another construction, the third ductility is less than the first ductility of the base portion 114. In this construction, the reinforcement body 162 is formed of a hot-stamped steel of grade PHS950Y1300T in approximately 1.2 mm gauge.

The pillar inner body 86 has a shape that generally mirrors the pillar outer body 82 and extends from the header 18 to the sill 22. The pillar inner body 86 defines a cover channel 178 with a cover trough surface 182 disposed between a pair of cover sidewalls 186, 190. The cover channel 178 has a shape that generally mirrors the channel 94, such that the cover channel 178 widens in a flared shape toward the sill 22. The pillar inner body 86 further includes a pair of cover flanges 194, 198 extending from crests 202, 206 of the cover sidewalls 186, 190 and has an upper cover portion 210 and a base cover portion 214. The upper cover portion 210 and the base cover portion 214 are delineated by a line 216.

When the pillar inner body 86 is assembled to the pillar outer body 82, the cover trough surface 182 of the cover channel 178 opposes the trough surface 98 of the pillar outer body 82. The cover flange 194 extends generally longitudinally toward the front end 62 of the vehicle 10 (FIG. 1) while the cover flange 198 extends generally longitudinally toward the rear end 66 of the vehicle 10 (FIG. 1). The pillar inner body 86 has a generally trough-shaped cross-section formed by the cover channel 178 and cover flanges 194, 198. Each of the cover flanges 194, 198 is welded to a respective one of the flanges 134, 138 of the pillar outer body 82 to align the trough-shaped cross-section of the pillar inner body 86 with the trough-shaped cross-section of the pillar outer body 82 to form a closed cross-section and encapsulate the reinforcement member 90 between the pillar outer body 82 and the pillar inner body 86. Cover sidewall 190 extends toward the exterior of the vehicle 10 to a greater extent than cover sidewall 186. The depth of the cover channel 178 varies along the length of the cover channel 178, is generally deeper proximate to the header 18, and is more shallow proximate to the sill 22.

The upper cover portion 210 is formed of a material of a fourth ductility and the base cover portion 214 is formed of a material of a fifth ductility that is more ductile than the fourth ductility. In the example provided, the upper cover portion 210 is formed of a steel of grade PHS950Y1300T in approximately 1.6 mm gauge and the base cover portion 214 is formed of a steel of grade PQS370Y550T in approximately 1.4 mm gauge, though other thicknesses can be used. In the example provided, the upper cover portion 210 and the base cover portion 214 are welded together to form one continuous blank sheet of steel before being formed into the shape described herein. In the example provided, the upper cover portion 210 overlaps with the upper portion 110 and the upper cover portion 210 overlaps with a length of the base portion 114 that is less than the entire base portion 114. The base cover portion 214 extends from the upper cover portion 210 to the sill 22.

When an impacting bumper strikes the vehicle 10 at the base portion 114 of the second pillar 30, the relatively ductile material of the base portion 114 allows the base portion 114 to deform instead of tear or buckle. The reinforcement body 162 provides additional stiffness to control the deformation of the base portion 114 when side-impact forces 218 (FIG. 3) act on the second pillar 30. Because the sides 166, 170 and the span 174 of the reinforcement body 162 are welded to the sidewalls 102, 106 and trough surface 98 of the channel 94, the U-shape of the reinforcement body 162 expands, or widens under impact instead of buckling or tearing, for controlled deformation. The expansion and controlled deformation of the reinforcement member 90 transfers the load from the impact forces 218 to longitudinal directions 222, 226. In this way, some of the impact forces 218 are dissipated toward the front and rear ends 62, 66 of the vehicle 10 instead of toward the interior of the vehicle 10. The flared shape of the reinforcement body 162 also directs some of the load of the impact forces 218 down and outward in the directions indicated by arrows 230, 234 (FIG. 2) and, thus, into the sill 22.

Dissipation of the impact energy by deformation in directions 222, 226, 230, 234 and into the sill 22 results in a minimization of energy directed toward the interior of the vehicle 10 and, thus, less deformation toward the interior of the vehicle 10. Because the top 172 of the reinforcement body 162 extends into the upper portion 110 of the second pillar 30 to overlap both the base portion 114 and the upper portion 110, the reinforcement body 162 provides continuity of strength and deformity between the base portion 114 and the upper portion 110. This continuity reduces the likelihood of buckling or tearing at the juncture 126 of the upper portion 110 and the base portion 114.

The pillar inner body 86 provides additional support to the pillar outer body 82, whereby the relatively ductile material of the base cover portion 214 allows the second pillar 30 to deform instead of buckle or tear. The relatively less ductile upper portion 110 and the upper cover portion 210 provide the rigidity necessary to support the header 18. Because the upper cover portion 210 extends over a length of the base portion 114 and overlaps both the upper portion 110 and the base portion 114, the pillar inner body 86 provides additional continuity of strength and deformity along the length of the second pillar 30.

Figure 4:
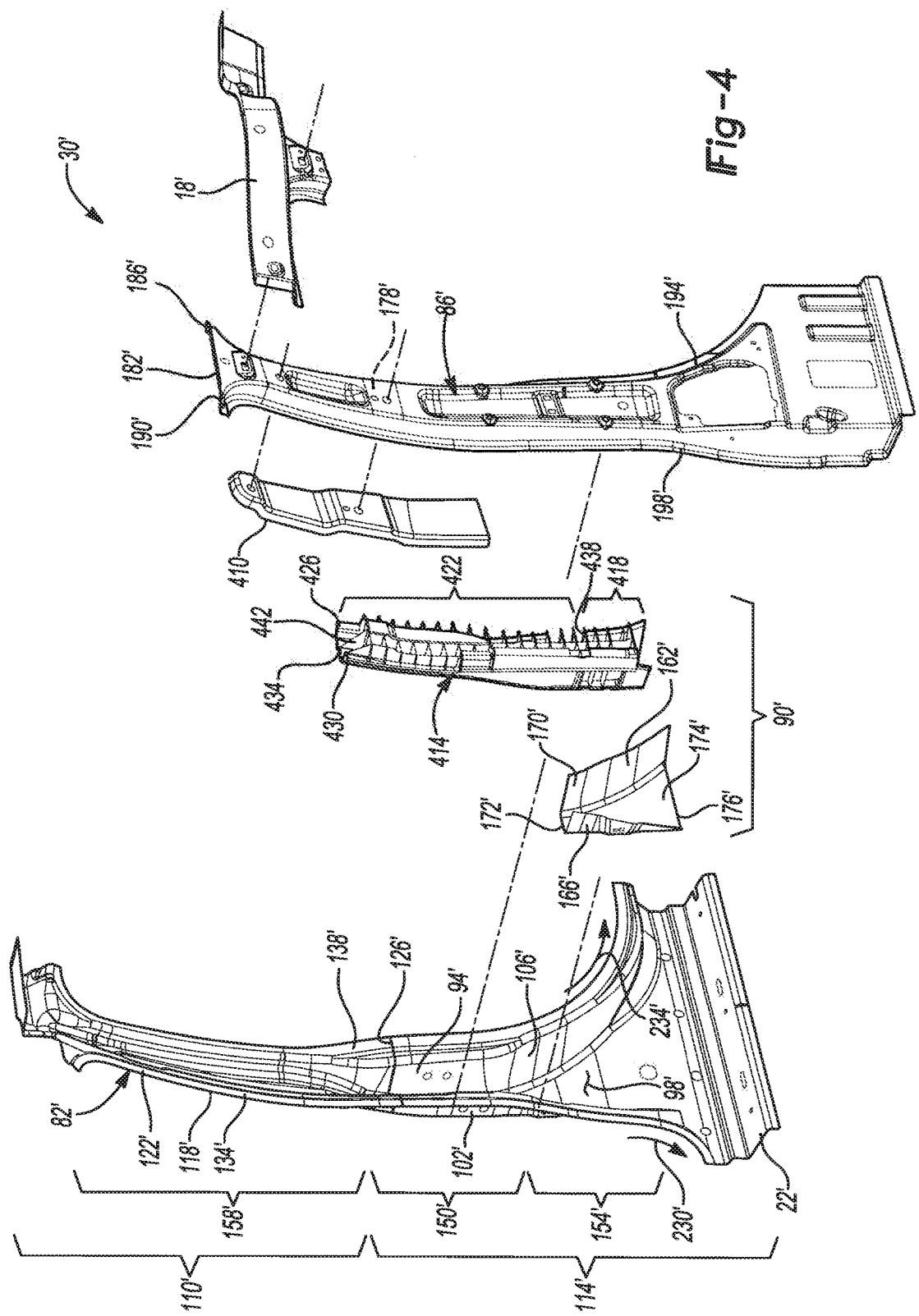
FIG. 4 is an exploded view of a portion of the vehicle body side of FIG. 1 showing a pillar of a second construction.

With reference to FIGS. 4 and 5, a second pillar 30' of a second construction is illustrated. The second pillar 30' includes a pillar outer body 82', a reinforcement member 90', a pillar inner body 86', and an inner patch 410. The pillar outer body 82' is similar in shape and construction to the pillar outer body 82, with primed reference numbers referring to similar features. Accordingly, only differences will be discussed. Unlike the pillar outer body 82, the upper portion 110' of the pillar outer body 82' is formed of a single gauge of material. In the example provided, the upper portion 110' is a steel of grade PHS950Y1300T in approximately 2.0 mm gauge, though other thicknesses can be used.

The reinforcement member 90' includes a reinforcement body 162' and an insert body 414. The reinforcement body 162' is similar to the reinforcement body 162, with primed reference numbers referring to similar features. Accordingly, only differences will be discussed.

In the present example, the top 172' of the reinforcement body 162' does not extend into the upper portion 110 of the pillar outer body 82'. Additionally, the reinforcement body 162' is formed of a relatively less ductile material than the base portion 114' of the pillar outer body 82'. In the example provided, the reinforcement body 162' is formed of a steel of grade PHS950Y1300T in approximately 1.6 mm gauge, though other thicknesses can be used.

The insert body 414 is formed of material and construction to be a relatively rigid structure. In the example provided, the insert body 414 is a 30% glass-filled thermoplastic material, such as a Nylon material, though other compositions can be used, and is formed in a manner to have a lower ductility than the reinforcement body 162'. The insert body 414 includes a pair of spaced apart wall members 426, 430, an insert span 434 coupling the wall members 426, 430, and a plurality of first ribs 438 extending between the pair of wall members 426, 430 and from the insert span 434 toward the interior of the vehicle 10. In the example provided, the insert body 414 also includes at least one second rib 442 extending from the insert span 434 toward the interior of the vehicle 10, perpendicular to the first ribs 438, and vertically along the length of the insert body 414.

Each of the wall members 426, 430 is received within the channel 94' proximate to one of the sidewalls 102', 106' and the ribs 438 are disposed transverse to the channel 94' to couple each wall member 426, 430 to one another and provide rigidity to the insert body 414. The insert body 414 is received in the channel 94' and has a lower segment 418 and an upper segment 422. The lower segment 418 extends within the channel 94' from the upper portion 110' of the pillar outer body 82' into the base portion 114' and is received in the U-shaped cross-section of the reinforcement member 90', between the sides 166', 170', to overlap with the top 172' of the reinforcement member 90'. In this construction, continuity between the upper portion 110' and base portion 114' is provided by the overlap of the lower segment 418 of the insert body 414 with the top 172' of the reinforcement body 162' and the base portion 114'. The upper segment 422 extends within the channel 94' of the upper portion 110' toward the header 18. In the example provided, the upper segment 422 does not fully extend to the header 18.

The pillar inner body 86' is similar in shape and construction to pillar inner body 86, with primed reference numbers referring to similar features. Only differences will be discussed. Unlike the pillar inner body 86, the pillar inner body 86' is formed of a single material. In the present example, the pillar inner body 86' is formed of a press-hardened steel of grade PQS340Y410T having a tensile strength of greater than or equal to 410 MPa, a yield strength of approximately 340-460 MPa, a percent total elongation in 25 mm of greater than or equal to 16%, a core hardness of 150-190 HV, and a core hardness of 78-90 HRB. The PQS340Y410T steel can optionally have an aluminum coating configured to inhibit corrosion of the steel material. One example of such a material commercially available is known as TRIP 690. In the example provided, the pillar inner body 86' is formed in approximately 1.2 mm gauge, though other thicknesses can be used.

The cover patch 410 includes a shape that is similar to the contour of the cover channel 178' proximate to the header 18'. The cover patch 410 is formed of a material that is less ductile than the pillar inner body 86'. In the example provided, the cover patch 410 is a hot-stamped steel in approximately 1.6 mm gauge. The cover patch 410 is welded within the cover channel 178' proximate to the header 18 and overlaps with the upper portion 110' of the pillar outer body 82'. In the example provided, the cover patch 410 overlaps with the upper segment 422 of the insert body 414 but does not overlap with the lower segment 418 or the reinforcement body 162'.

When a bumper impacts the base portion 114' of the second pillar 30', the relatively ductile material of the base portion 114' allows the base portion 114' to deform in a controlled manner instead of tear or buckle. The reinforcement body 162' provides additional stiffness to control the deformation of the base portion 114' when side impact forces 218' act on the second pillar 30'. Because the sides 166, 170 and the span 174 of the reinforcement body 162 are welded to the sidewalls 102, 106 and trough surface 98 of the channel 94, the U-shape of the reinforcement body 162' expands, or widens under impact instead of buckling or tearing, for controlled deformation. The expansion and controlled deformation of the reinforcement member 90' transfers the load from the impact forces 218' to longitudinal directions 222', 226'. In this way, some of the impact forces 218' are dissipated toward the front and rear ends 62, 66 of the vehicle body side 14 instead of toward the interior of the vehicle. The flared shape of the reinforcement body 162' also directs some of the load of the impact forces 218' down and outward in the directions indicated by arrows 230', 234' and, thus, into the sill 22.

The dissipation of the impact energy by deformation in directions 222', 226', 230', 234' and into the sill 22 reduces the amount of energy directed toward the interior of the vehicle and, thus, less deformation toward the interior of the vehicle. Because the lower section 154' of the insert body 414 extends into the base portion 114' of the second pillar 30' to overlap with the top 172' of the reinforcement body 162', the lower section 154' and the top 172' of the reinforcement body 162' provide continuity of strength and deformity between the base portion 114' and the upper portion 110'. This continuity reduces the likelihood of buckling or tearing at the juncture 126' of the upper portion 110' and the base portion 114'. The pillar inner body 86' provides additional support to the pillar outer body 82' while the relatively ductile material of the pillar inner body 86' allows the second pillar 30' to deform instead of buckle or tear. The relatively less ductile upper portion 110' and the cover patch 410' provide the rigidity necessary to support the header 18.

What is claimed is:

1. A side structure for a vehicle, the side structure comprising:
   a sill;
   a header spaced apart from said sill;
   a pillar outer body extending between said sill and said header and defining an inner channel open toward an interior of the vehicle, said pillar outer body having a lower body portion formed of a first material and an upper body portion formed of a second material, said lower body portion disposed between said upper body portion and said sill;

an inner cover attached to said pillar outer body and extending between said sill and said header, said inner cover having a lower cover portion disposed proximate to said sill and formed of said first material having a first ductility and an upper cover portion disposed proximate to said header and formed of said second material having a second ductility less than said first ductility; and a reinforcement member disposed within said inner channel and welded to said pillar outer body proximate to a junction of said pillar outer body and said sill, said reinforcement member overlapping with said lower body portion and a first length of said upper body portion that is less than an entire length of said upper body portion, said entire length being from said lower body portion to said header.

2. The side structure of claim 1, wherein said reinforcement member is formed of said first material.

3. The side structure of claim 1, wherein said reinforcement member is formed of said second material.

4. The side structure of claim 1, wherein said reinforcement member has a generally U-shaped cross-section open toward said interior of the vehicle.

5. The side structure of claim 1, wherein said reinforcement member widens in a direction toward said sill.

6. The side structure of claim 1, wherein said first ductility corresponds to a steel of grade PQS370Y550T, and said second ductility corresponds to a steel of grade PHS950Y1300T.

7. The side structure of claim 1, wherein said upper cover portion overlaps with said upper body portion and a length of said lower body portion.

8. A side structure for a vehicle, the side structure comprising:
a sill;
a header spaced apart from said sill;
a pillar outer body extending between said sill and said header and defining an inner channel open toward an interior of the vehicle, said pillar outer body having a lower body portion formed of a first material and an upper body portion formed of a second material, said lower body portion disposed between said upper body portion and said sill; and
an inner cover attached to said pillar outer body and extending between said sill and said header, said inner cover having a lower cover portion disposed proximate to said sill and formed of said first material having a first ductility and an upper cover portion disposed proximate to said header and formed of said second material having a second ductility less than said first ductility;
wherein said upper body portion includes a lower segment proximate to said lower body portion and an upper segment proximate to said header that cooperate to define said inner channel, said lower segment and said upper segment each being formed of a different gauge of the second material.

9. The side structure of claim 8, further comprising a reinforcement member disposed within said inner channel and welded to said pillar outer body proximate to a junction of said pillar outer body and said sill, wherein said reinforcement member is between said pillar outer body and said inner cover and overlaps with said lower segment and not with said upper segment.

10. The side structure of claim 8, further comprising a reinforcement member disposed within said inner channel and welded to said pillar outer body proximate to a junction of said pillar outer body and said sill, wherein said reinforcement member is formed of one of said first material or said second material.

11. A side structure for a vehicle comprising:
a sill;
a header spaced apart from said sill;
a pillar extending between said header and said sill and defining an inner channel having a lower portion disposed proximate to said sill and an upper portion disposed proximate to said header, said lower portion being formed from a first material having a first ductility;
a reinforcement member formed from a second material having a second ductility less than said first ductility, said reinforcement member being received within said lower portion of said inner channel and attached to said pillar proximate to a junction of said pillar and said sill; and
an insert received in said inner channel and including a first portion disposed proximate to said sill and overlapping with said reinforcement member such that said reinforcement member is between said lower portion and said first portion, and a second portion disposed proximate to said header and defining a plurality of ribs.

12. The side structure of claim 11, wherein said inner channel has a generally U-shaped cross-section open toward an interior of said vehicle.

13. The side structure of claim 12, wherein said inner channel extends substantially the entire length of said pillar.

14. The side structure of claim 12, wherein said reinforcement member includes a body having a base end disposed proximate to said sill and a top end disposed proximate to said header, said body having a generally U-shaped cross-section open toward said interior of said vehicle and widening from said top end to said base end.

15. The side structure of claim 11, wherein said first ductility corresponds to a steel of grade PQS370Y550T, and said second ductility corresponds to a steel of grade PHS950Y1300T.

16. The side structure of claim 11, wherein said upper portion is formed from a third material having a third ductility that is less than said first ductility.

17. The side structure of claim 16, wherein said reinforcement member extends between and overlaps said upper portion and said lower portion.

18. The side structure of claim 11, further comprising an inner cover attached to and extending along a length of said pillar, said inner cover opposing said inner channel to provide the side structure with a closed cross-section at said inner cover, said reinforcement member being disposed between said inner cover and said inner channel.

19. The side structure of claim 11, wherein said insert is a thermoplastic material.

20. The side structure of claim 11, wherein said reinforcement member does not overlap with said second portion of said insert.

* * * * *